United States Patent
Katsuyama et al.

(10) Patent No.: US 7,641,475 B2
(45) Date of Patent: Jan. 5, 2010

(54) PROGRAM, METHOD AND APPARATUS FOR GENERATING FILL-IN-THE-BLANK TEST QUESTIONS

(75) Inventors: Yutaka Katsuyama, Kawasaki (JP); Noriaki Ozawa, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 11/313,962

(22) Filed: Dec. 22, 2005

(65) Prior Publication Data

US 2007/0072164 A1 Mar. 29, 2007

(30) Foreign Application Priority Data

Sep. 29, 2005 (JP) .............................. 2005-283789

(51) Int. Cl.
*G09B 3/00* (2006.01)
(52) U.S. Cl. ....................... 434/322; 434/323; 434/350; 434/353
(58) Field of Classification Search ................. 434/322, 434/323, 350, 353
See application file for complete search history.

(56) References Cited

U.S. PATENT DOCUMENTS

| | | | | |
|---|---|---|---|---|
| 5,141,439 | A * | 8/1992 | Cousins | 434/178 |
| 6,302,698 | B1 * | 10/2001 | Ziv-El | 434/323 |
| 6,632,096 | B1 * | 10/2003 | Sumimoto | 434/322 |
| 6,766,066 | B2 * | 7/2004 | Kitazawa | 382/291 |
| 7,341,352 | B2 * | 3/2008 | Katsuyama | 353/42 |

FOREIGN PATENT DOCUMENTS

| | | | |
|---|---|---|---|
| JP | 05019163 | | 1/1993 |
| JP | 06095583 | | 4/1994 |
| JP | 07302036 | | 11/1995 |
| JP | 08274646 | | 10/1996 |
| JP | 2000148079 | | 5/2000 |
| JP | 2001188792 | | 7/2001 |
| JP | 2003173129 | A * | 6/2003 |
| JP | 2003248417 | | 9/2003 |

OTHER PUBLICATIONS

Nakano et al., Unified Presentation Contents Retrieval Using Laser Pointer Information, Apr. 4, 2005, IEEE Computer Society, Proceedings of the 21st International Conference on Data Engineering (ICDE '05), pp. 1-3.*

* cited by examiner

*Primary Examiner*—Kathleen Mosser
*Assistant Examiner*—Jerry-Daryl Fletcher
(74) *Attorney, Agent, or Firm*—Staas & Halsey LLP

(57) ABSTRACT

A pointing information extraction unit extracts pointing information indicating a pointing position and a pointing time on a slide from a slide file used in a lecture and a video file of a lecture video using a pointing device. A word information generation unit analyzes a text sentence extracted from the slide file to generate a word information file indicating a word and a position thereof. A word pointing information generation unit estimates a word closest to the pointing position on the slide to generate a word pointing information file with the pointing time assigned. A fill-in-the-blank word extraction unit extracts a word having a pointing time equal to or longer than a predetermined time from the word pointing information as a fill-in-the-blank word file. A fill-in-the-blank test question is generated by setting the fill-in-the-blank word of the slide information as a blank region.

16 Claims, 17 Drawing Sheets

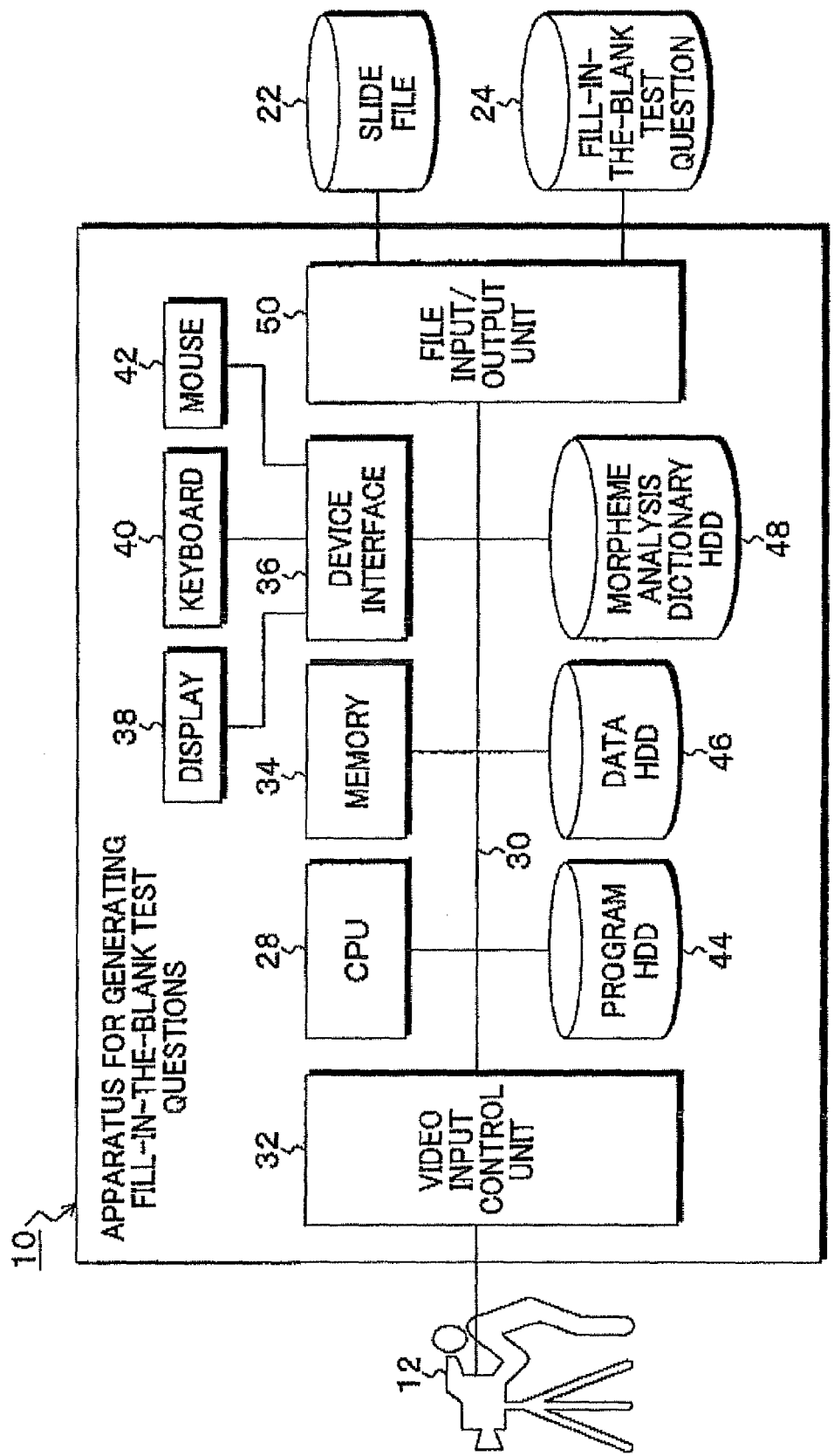

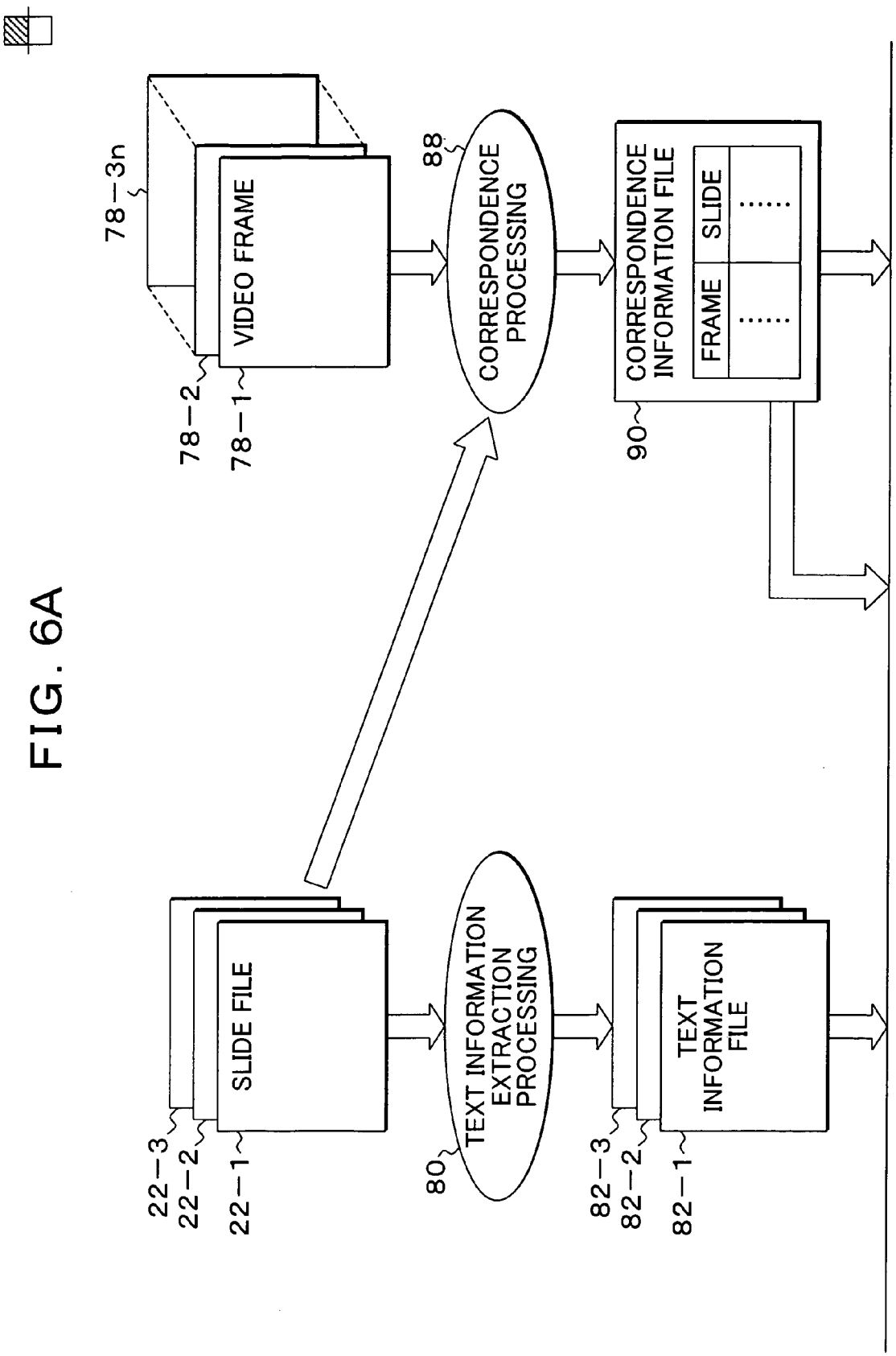

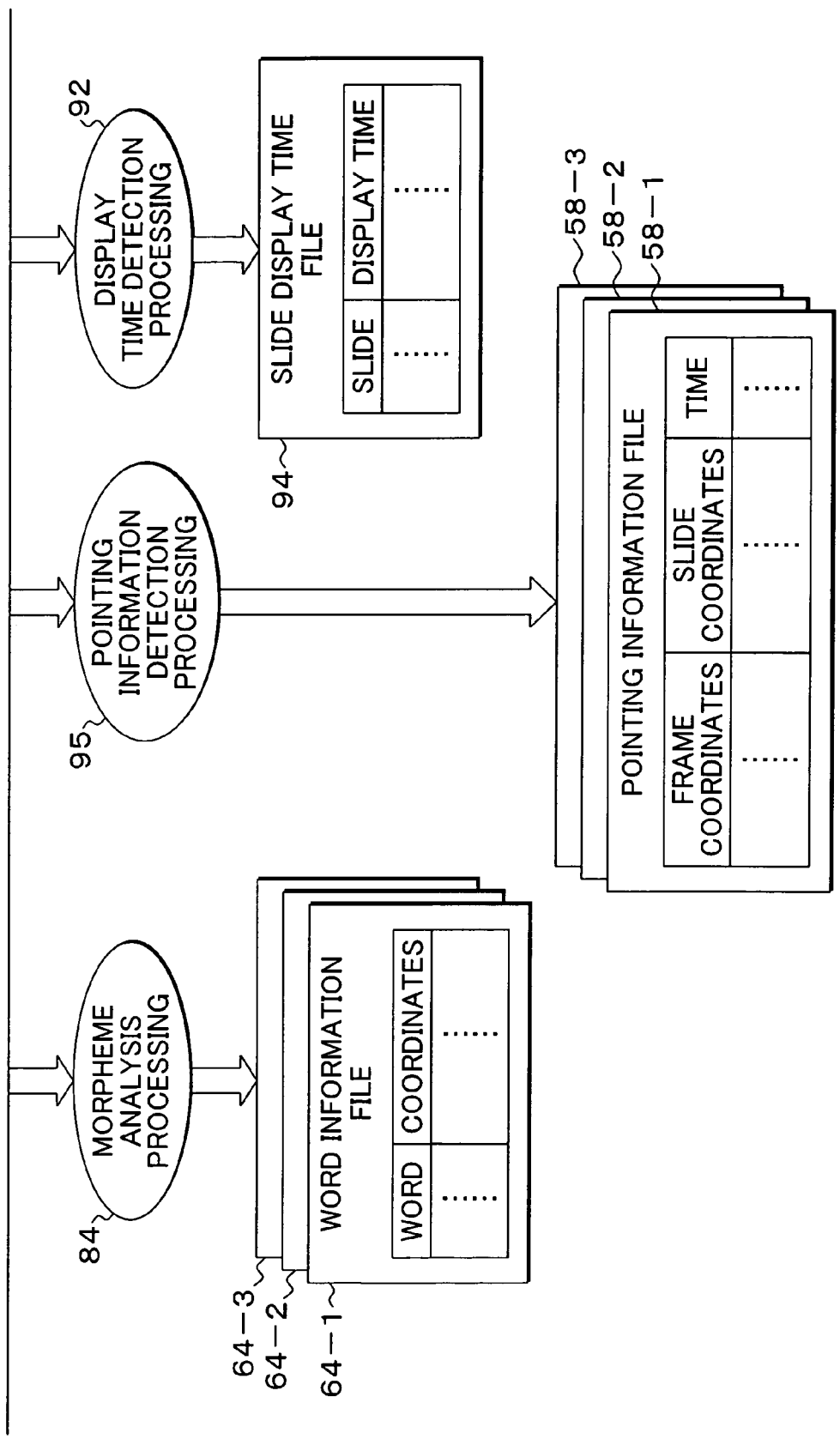

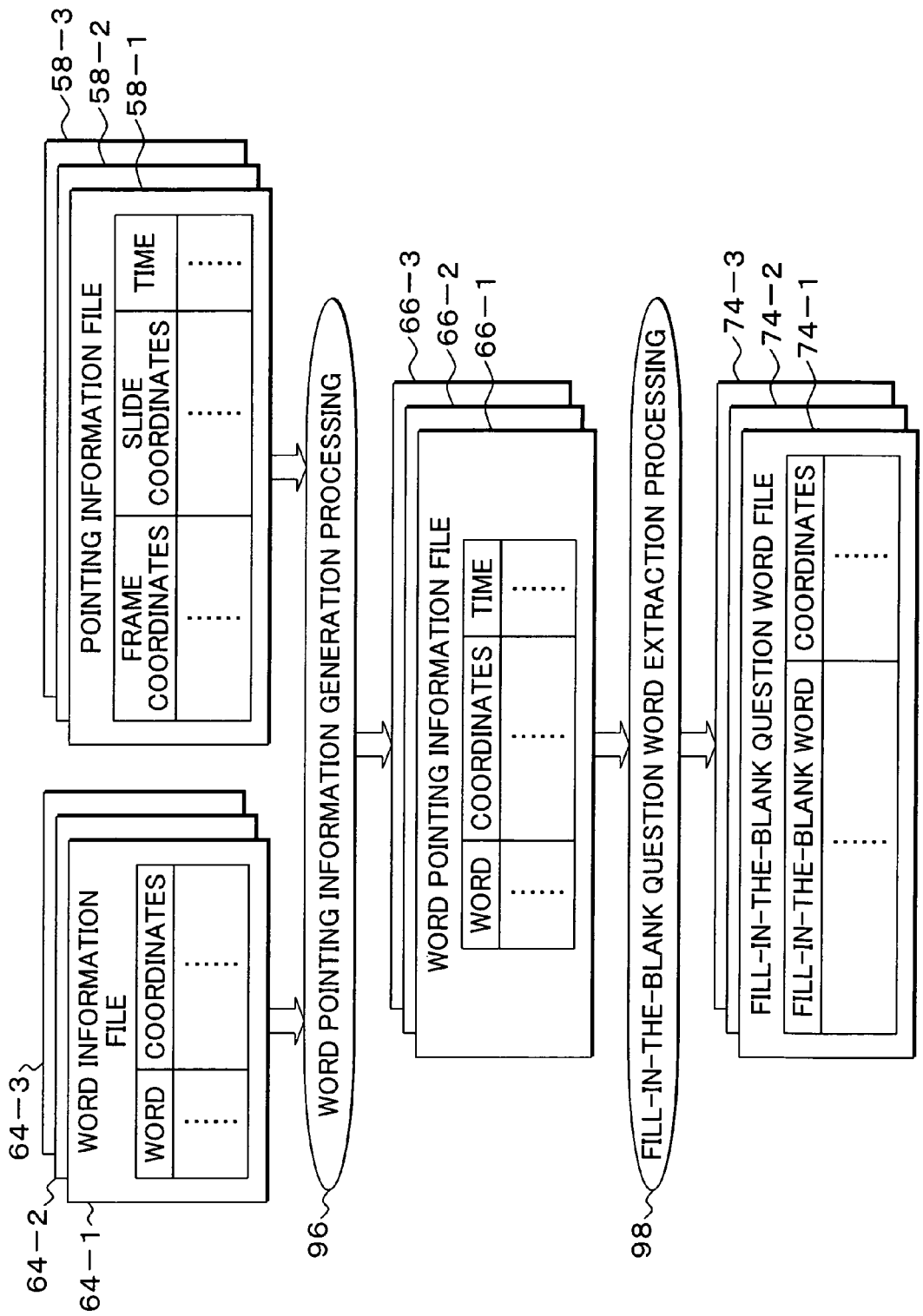

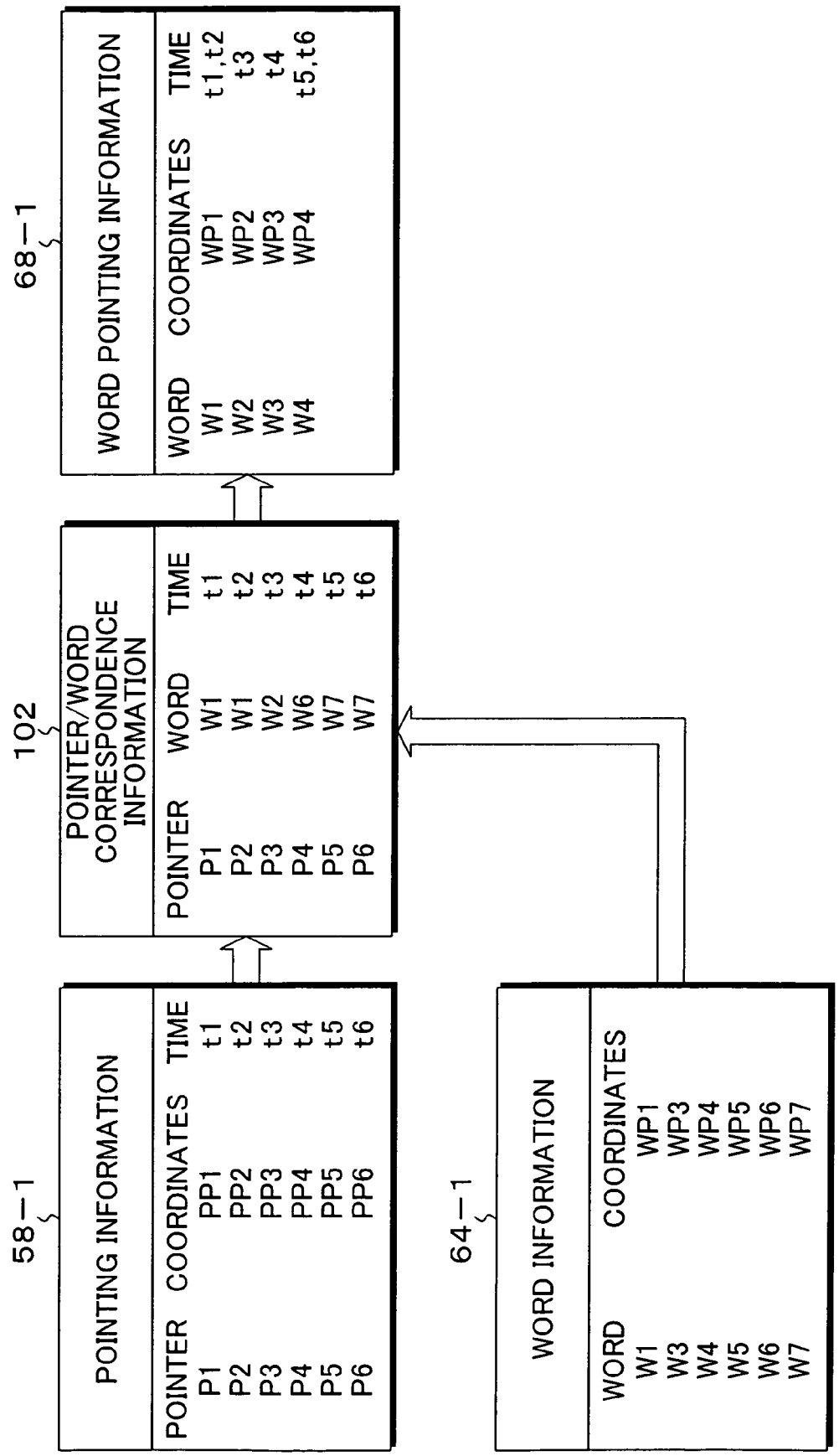

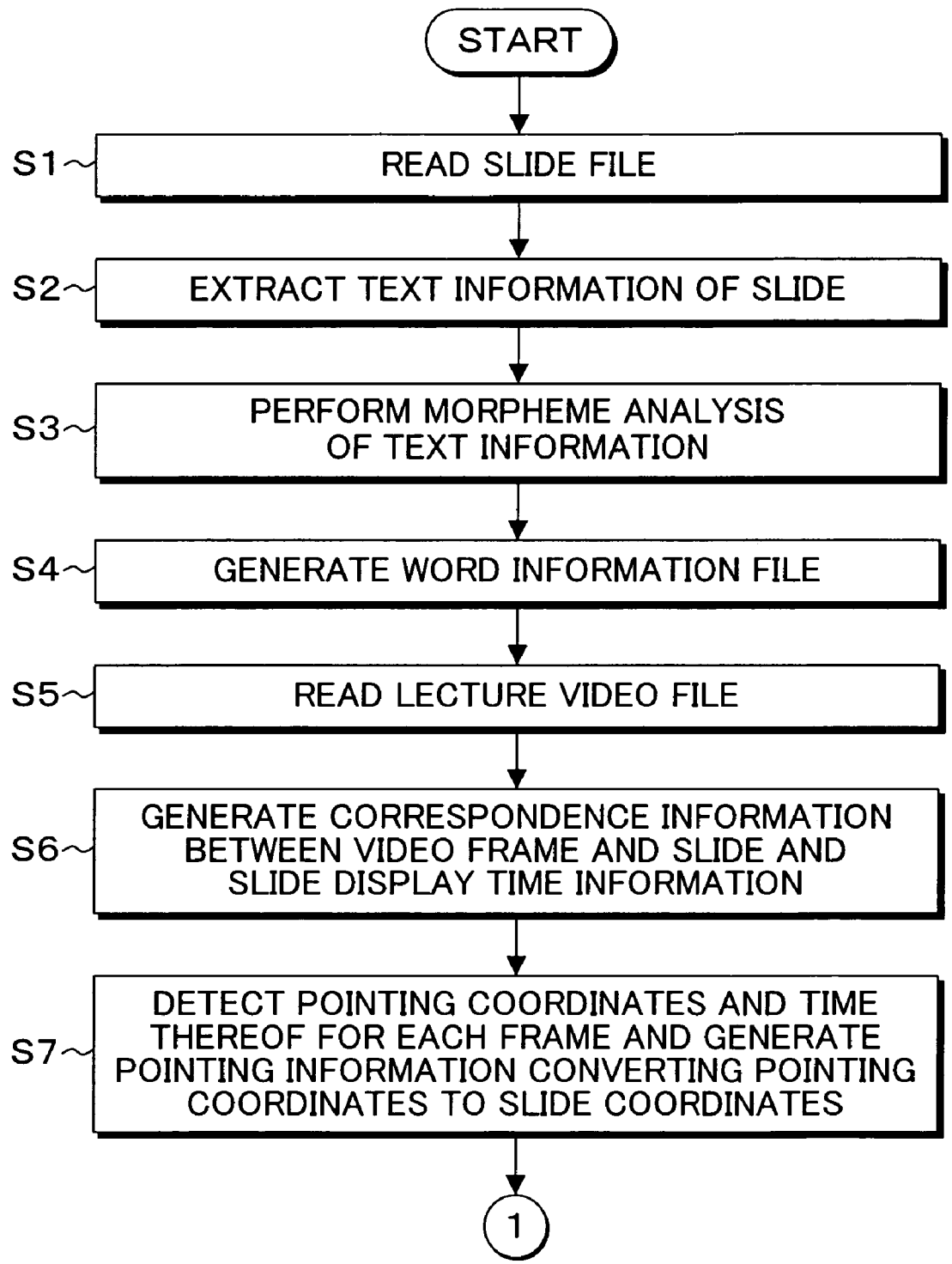

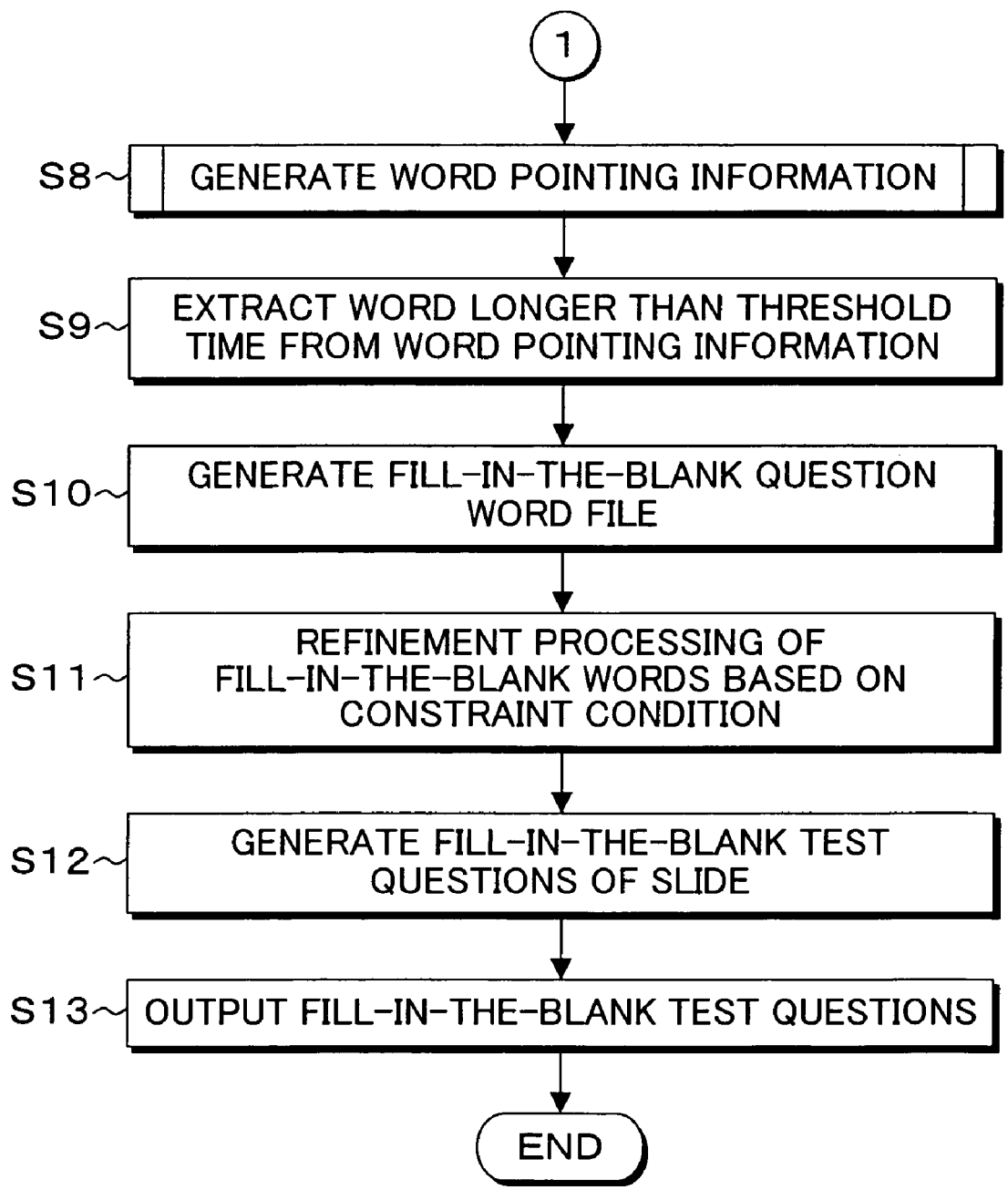

PROGRAM, METHOD AND APPARATUS FOR GENERATING FILL-IN-THE-BLANK TEST QUESTIONS

CROSS-REFERENCE TO RELATED APPLICATION

This application claims the benefit of priority to prior application No. JP 2005-283789, filed Sep. 29, 2005 in Japan, of which full contents are incorporated herein by reference.

BACKGROUND OF THE INVENTION

1. Field of the Invention

The present invention relates generally to a program, method and apparatus for generating fill-in-the-blank test questions by replacing a portion of a presentation material such as a slide used for a lecture with blanks, and more particularly, to a program, method and apparatus for automatically generating fill-in-the-blank test questions by coordinating with a video of a lecture using a pointing tool such as a laser pointer for the presentation material.

2. Description of the Related Art

In fields of in-company training and a general education, e-learning is increasingly introduced. The e-learning is a remote-area education using the internet and is often performed using a web screen. Since a lecturer cannot check reactions of students in the e-learning, a test is usually conducted on the web screen after the learning on the web screen. In order to generate the web test content, a large amount of man-hours is needed since the content is generated by an expert who understands details of the content with consideration of importance of the details. On the other hand, in the web content in the form of using a lecture video, a lecturer usually spends more time describing an important portion during shooting of the lecture. If the important portion described for a longer time can be automatically extracted from the material used in the lecture, test questions can be automatically generated.

The following is known as prior art for generating such fill-in-the-blank test questions.

(1) After any characters of a document shown on a screen are turned to unprinted characters with simple operation of a pointing device, the unprinted characters are displayed and checked with simple operation.

(2) A region of a target character string for rote learning is specified from a displayed document with a rote-learning assistance apparatus and a medium pen storing a rote-learning assistance program.

(3) With a mask edit unit, without editing (changing) an educational material which already exist, apparent changes can be made by performing mask setting to any regions of the educational material only for any time period (patent document 3). Therefore, while enhancing reusability, mask-style questions can be easily generated and a learner can make apparent changes without editing the educational material.

(4) For example, if "Succeeding Nobnaga Oda, Hideyoshi Toyotomi destroyed Hojo-shi in Odawara and dominated the whole country in 1590" is input as a learning target sentence, words with word-class information of personal names, place names and numeric characters are randomly selected from this sentence to automatically generate a question sentence, answer fields and right answers of fill-in-the-blank questions. Therefore, a workload for generating questions can be reduced and, if a learner studies using this apparatus, a practical ability can be obtained and a learning effect can be expected.

However, in such conventional fill-in-the-blank test question generation, a user specifies fill-in-the-blank portions manually while watching a screen and fill-in-the-blank test questions are not automatically generated. In (1), only the portions specified on the screen by the user with a mouse pointer and the like are switched to be displayed or not, and it takes a lot of man-hours to manually generate test questions. In (2), the fill-in-the-blank portions are instructed on the screen with a pen, and it takes a lot of man-hours since test questions are generated manually. In (3), only the portions specified on the screen by the user with a mouse pointer and the like are switched to be displayed or not, and it takes a lot of man-hours to generate test questions since the fill-in-the-blank portions are manually specified by the user. Also, in conventional fill-in-the-blank test question generation, although the fill-in-the-blank test questions can be automatically generated from a lecture material, suitable questions cannot be generated since fill-in-the-blank portions are generated from portions which is not considered as important by a lecturer. In other words, in (4), words with word-class information of personal names, place names and numeric characters are randomly selected from a text to automatically generate a question sentence, answer fields and right answers of fill-in-the-blank questions, and importance of fill-in-the-blank items considered by the lecturer is not determined. On the other hand, the applicant of the present invention has been developed an automatic generation technology for the content which synchronizes and regenerates on the web a video recording a lecture and a slide used in the lecture and a technology for automatically generating from a lecture video the content which regenerates on the web the laser-pointer information in a lecture using a laser pointer (Japanese Patent Application No. 2004-569359). In the web content in the form of using a lecture video, a lecturer usually spends more time describing an important portion during shooting of the lecture. If the important portion described for a longer time can be automatically extracted from the material used in the lecture, test questions can be automatically generated.

SUMMARY OF THE INVENTION

According to the present invention there are provided a program, method and apparatus for automatically generating suitable fill-in-the-blank test questions by determining important portions of slide information used in a lecture from pointing portions of a laser pointer and the like in a lecture video. In order to achieve the above object, the present invention is configured as follows.

(Program)

The present invention provides a fill-in-the-blank test question generation program operable to drive a computer to execute:

a pointing information extraction step of extracting pointing information indicating a pointing position and a pointing time on a slide from slide information used in a lecture and a video image of the lecture using a pointing device;

a word information generation step of analyzing text information extracted from the slide information to generate word information indicating a word and a position thereof;

a word pointing information generation step of estimating a word closest to the pointing position on the slide to generate word pointing information with the pointing time assigned;

a fill-in-the-blank word extraction step of extracting a word having a pointing time equal to or longer than a predetermined time from the word pointing information as a fill-in-the-blank word; and a test question generation step of setting the fill-in-the-blank word of the slide information as a blank region to generate a fill-in-the-blank test question.

The word information generation step performs a morpheme analysis of the text information to generate the word information indicating a word and a position thereof.

The pointing information extraction step:

identifies a correspondence relationship with the slide information for each video frame of the video information;

detects a display time of each slide by grouping video frames for each of the slides using the identified corresponding relationship; and extracts pointing information indicating pointing positions and pointing clock times on the slides by extracting pointing positions and extracting pointing clock times for each of the slides, which are converted into pointing positions on the identified slides.

The pointing information extraction step extracts a bright point of a laser pointer, a mouse cursor interlocked with mouse operation on a personal computer, a tip portion of a pointing stick and a hand or fingertip of a lecturer existing in video information, as a pointing position. The pointing information extraction step detects a word closest to a pointing position for each slide, assigns a pointing time and aggregates pointing clock times of the same word to generate a pointing time for each word. The test question generation step extracts a fill-in-the-blank word satisfying predetermined constraint conditions from the fill-in-the-blank word information to generate a fill-in-the-blank test question. The test question generation step selects fill-in-the-blank characters by setting the constraint conditions as at least one of:

being equal to or smaller than the number of fill-in-the-blank words set per line;

not being adjacent to a preceding fill-in-the-blank word; and being equal to or smaller than the number of fill-in-the-blank words set per slide page.

If the number of the fill-in-the-blank words is limited to a predetermined number or less by the constraint conditions, the test question generation step selects the fill-in-the-blank words equal to or smaller than the predetermined number in accordance with predetermined priority conditions. The test question generation step selects fill-in-the-blank characters by setting the priority conditions as at least one of:

giving priority to a noun; or giving priority to a predefined character type among character types such as English, katakana, kanji, hiragana and the like.

(Method)

The present invention provides a fill-in-the-blank test question generation method comprising:

a pointing information extraction step of extracting pointing information indicating a pointing position and a pointing time on a slide from slide information used in a lecture and a video image of the lecture using a pointing device;

a word information generation step of analyzing text information extracted from the slide information to generate word information indicating a word and a position thereof;

a word pointing information generation step of estimating a word closest to the pointing position on the slide to generate word pointing information with the pointing time assigned;

a fill-in-the-blank word extraction step of extracting a word having a pointing time equal to or longer than a predetermined time from the word pointing information as a fill-in-the-blank word; and a test question generation step of setting the fill-in-the-blank word of the slide information as a blank region to generate a fill-in-the-blank test question.

(Apparatus)

The present invention provides a fill-in-the-blank test question generation apparatus comprising:

a pointing information extraction unit extracting pointing information indicating a pointing position and a pointing time on a slide from slide information used in a lecture and a video image of the lecture using a pointing device;

a word information generation unit analyzing text information extracted from the slide information to generate word information indicating a word and a position thereof;

a word pointing information generation unit estimating a word closest to the pointing position on the slide to generate word pointing information with the pointing time assigned;

a fill-in-the-blank word extraction unit extracting a word having a pointing time equal to or longer than a predetermined time from the word pointing information as a fill-in-the-blank word; and a test question generation unit setting the fill-in-the-blank word of the slide information as a blank region to generate a fill-in-the-blank test question.

Details of the method and the apparatus of the fill-in-the-blank test question generation according to the present invention are basically the same as the case of the program for generating the fill-in-the-blank test questions of the present invention. According to the present invention, since in web content in the form of using video of a lecture using a slide, a lecturer usually spends more time describing an important portion during shooting of the lecture using the slide and the important portion of the slide is pointed with the use of a laser pointer or the like many times, by automatically extracting the important portion within a sentence on the slide from pointing information of the laser pointer or the like in the lecture video and by replacing a word of the important portion with a blank, a fill-in-the-blank test question can be automatically generated which is suitable for determining whether the content of the lecture has been learned or not; automatic generation can be achieved for fill-in-the-blank test questions which are conventionally generated by the lecturer separately from the lecture slide; time and effort is reduced as compared to artificial generation; and costs can be considerably reduced. Also, once the lecture being recorded on a video is ended, suitable fill-in-the-blank questions in conformity with the lecture content can be rapidly generated from the lecture video, which can be useful for checking a level of understanding of students by timely offering a brief test to the students. The above and other objects, features and advantages of the present invention will become more apparent from the following detailed description with reference to the drawings.

BRIEF DESCRIPTION OF THE DRAWINGS

FIG. 2 is a block diagram of a hardware configuration of the fill-in-the-blank test question generation apparatus according to the present invention;

FIGS. 6A and 6B are explanatory views of a procedure of fill-in-the-blank test question generation processing of the present invention;

FIG. 7 is an explanatory view of a procedure of the fill-in-the-blank test question generation processing continued from FIGS. 6A and 6B;

FIG. 12 is a flowchart of the fill-in-the-blank test question generation processing according to the present invention.

DETAILED DESCRIPTION OF THE PREFERRED EMBODIMENT

Figure 1:
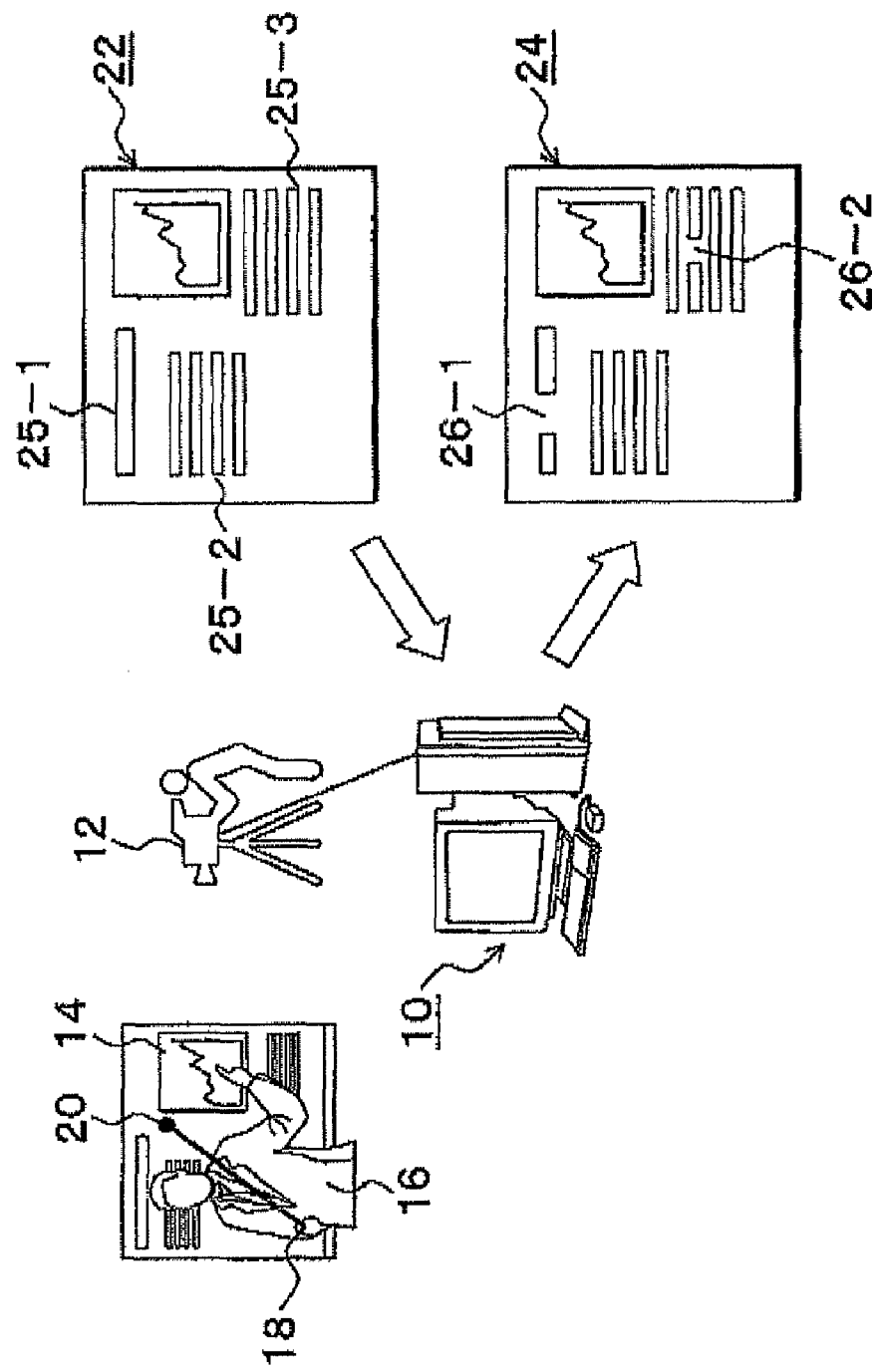
FIG. 1 is an explanatory view of a use environment of a fill-in-the-blank test question generation apparatus according to the present invention.

FIG. 1 is an explanatory view of an example of a use environment of an apparatus for generating fill-in-the-blank test questions according to the present invention. In FIG. 1, a fill-in-the-blank test question generation apparatus 10 according to the present invention is constituted by an information processing apparatus, for example, a personal computer. The processing of the fill-in-the-blank test question generation apparatus 10 requires lecture-video information and slide information used in a lecture. Therefore, a video camera 12 shoots a lecture of a lecturer 16 using a slide 14 and a pointing device such as a laser pointer 18. The lecture image shot by the video camera 12 includes an image of a laser spot (a bright spot) 20 pointed with the laser pointer 18 used by the lecturer 16 for describing the slide 14. In such a lecture using the slide 14, since the lecturer 16 spends more time describing an important portion of the slide 14 and the important portion is described while being pointed with the laser pointer 18 many times at the time of the description, therefore, the important portion described for a longer time by the lecturer 16 can be determined from a image state of the laser spot 20 due to the laser pointer 18 on the slide 14. The video information shot by the video camera 12 is converted into the AVI (Audio Video Interleaving) format or the like and is stored into the fill-in-the-blank test question generation apparatus 10. Also, a slide file 22 such as a PowerPoint® file is input to the fill-in-the-blank test question generation apparatus 10 as the slide information used in the lecture. After inputting such video information from the video camera 12 and the slide file 22 used in the lecture, portions described for a longer time by the lecturer 16 in the lecture are determined as important portions and a fill-in-the-blank test question file 24 is automatically generated with those portions blanked. The slide file used here includes text sentences 25-1, 25-2 and 25-3, and for the slide file 22 which was projected on the slide 14 in the lecture, since the lecturer 16 uses the laser pointer 18 to point important portions in the text sentences 25-1 to 25-3 with the laser spot 20, the important portions are determined from detection information of the laser spot 20 in the video image and the fill-in-the-blank test question file 24 is generated by forming blanks 26-1 and 26-2 in the fill-in-the-blank test question file 24.

FIG. 2 is a block diagram of a hardware configuration of the fill-in-the-blank test question generation apparatus 10 according to the present invention. In FIG. 2, the fill-in-the-blank test question generation apparatus 10 connects a bus 30 of a CPU 28 with a video input control unit 32, a memory 34 such as a RAM, a device interface 36 connecting a display 38, keyboard and mouse 42, a program HDD (hard disk device) 44, a data HDD 46, a morpheme analysis dictionary HDD 48 and a file input/output unit 50. The video input control unit 32 is externally connected with the video camera 12, and the video images of the lecture shot by the video camera 12 as shown in FIG. 1 are accumulated as a video file though the video input control unit 32 into the data HDD 46 in the AVI format and the like. On the other hand, the file input/output unit 50 is connected with the slide file 22 such as the power pointer used in the lecture and the slide file 22 is stored in the data HDD 46 through the file input/output unit 50. In the program HDD 46, a fill-in-the-blank test question generation program according to the present invention is installed as an application program. Such a fill-in-the-blank test question generation apparatus 10 is realized by a hardware environment of a personal computer. When the fill-in-the-blank test question generation apparatus 10 is activated, i.e., when reading out to the memory 34 and executing the fill-in-the-blank test question generation program in the program HDD 44 installed as an application program in a computer, the stored video information of the lecture and slide information used in the lecture are read into the memory 34 to determine portions described for a longer time by the lecturer in the lecture as important portions; the fill-in-the-blank test questions are generated with the portions blanked; and the generated fill-in-the-blank test questions are converted into, for example, the HTML format and stored in the fill-in-the-blank test question file 24.

Figure 3A:
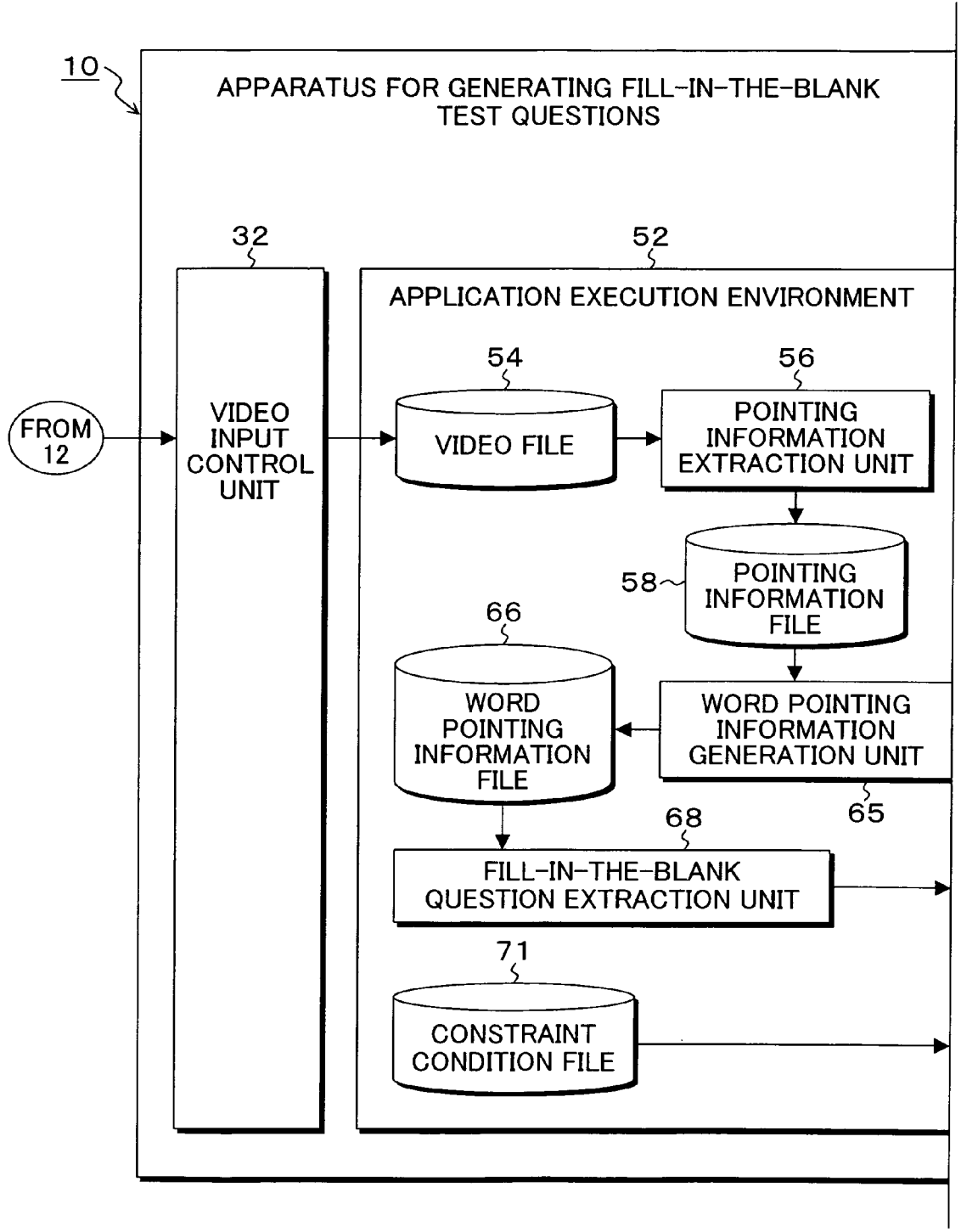
FIGS. 3A and 3B are block diagrams of a functional configuration of the fill-in-the-blank test question generation apparatus according to the present invention.
Figure 3B:
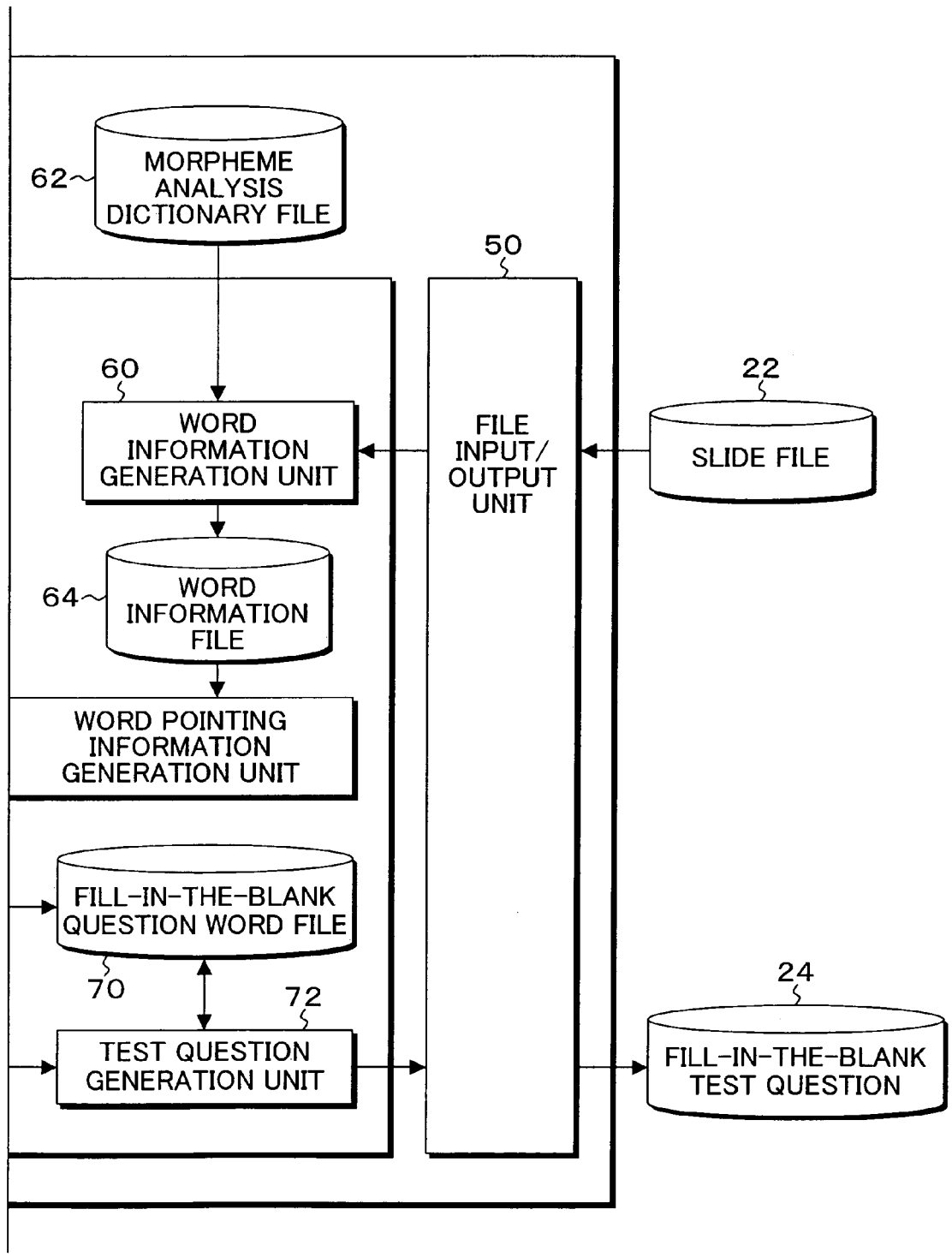

FIGS. 3A and 3B are block diagrams of a functional configuration of the fill-in-the-blank test question generation apparatus 10 according to the present invention and the functions are realized by the CPU 28 executing the fill-in-the-blank test question generation program loaded from the program HDD 45 to the memory 34. In FIGS. SA and SB, the fill-in-the-blank test question generation apparatus 10 is provided with an application execution environment 52 for executing the fill-in-the-blank test question generation program. The application execution environment 52 is provided with a video file 54, a pointing information extraction unit 56, a pointing information file 58, a word information generation unit 60, a word information file 64, a word pointing information generation unit 65, a word pointing information file 66, a fill-in-the-blank question word extraction unit 68, a fill-in-the-blank question word file 70, a test question generation unit 72 and a constraint condition file 71. Although a slide file is provided by the data HDD 46 of FIG. 2 for the word information generation unit 60 as is the case with the video file 54, this file is omitted since this file has the same content as the external slide file 22. Also, for the word information generation unit 60, a morpheme analysis dictionary file 62 is provided externally. From the slide file 22 used in the lecture and the video information of the lecture of the video file 54 using the pointing device, the pointing information extraction unit 56 extracts the pointing information indicating pointing positions on the slide and pointing time for each slide, which is stored into the pointing information file 58. For each slide used in the lecture, the word information generation unit 60 extracts text information from the slide and obtains words and position coordinates thereof by executing a morpheme analysis based on the morpheme analysis dictionary file 62 for the extracted text information, which are stored into the word information file 64. The word pointing information generation unit 65 reads the pointing information and the word information for each slide from the pointing information file 58 and the word information file 64, estimates a word closest to the pointing position on the slide and generates the word pointing information assigned with the pointing time, which is stored into the word pointing information file 66. Once the word pointing information is generated, the pointing time of the pointing with the laser pointer has been obtained for each word in the slide and the longer pointing time represents the important portion described by the lecturer for a longer time. The fill-in-the-blank question word extraction unit 68 reads the word pointing information from the word pointing information file 66 for each slide, extracts as a fill-in-the-blank word a word having the pointing time equal to or longer than a predetermined time defined in advance, i.e., equal to or longer than a threshold value indicating a predetermined importance level from the pointing time assigned to each word in the word pointing information and stores the word into the fill-in-the-blank question word file 70. The test question generation unit 72 reads the fill-in-the-blank words for each slide from the fill-in-the-blank question word file 70, sets the regions of the fill-in-the-blank words of the slide information to blank regions to generate fill-in-the-blank test questions which is converted into, for example, the HTML format and which is output to the fill-in-the-blank test question file 24 as the fill-in-the-blank test question content. For the test question generation unit 72, the constraint condition file 71 is provided and the fill-in-the-blank test question can be generated using constraint conditions stored in the constraint condition file 71. The constraint conditions stored in the constraint condition file 71 are as follows:

(1) Being equal to or smaller than a predetermined number of the fill-in-the-blank words set per line;

(2) Not being adjacent to a preceding fill-in-the-blank word; and (3) Being equal to or smaller than a predetermined number of the fill-in-the-blank words set per slide page.

Also, priority conditions are set to the constraint condition file 71. With these conditions, when the number of the fill-in-the-blank words per slide page or per line is limited to a predetermined number, in the case such that a multiplicity of candidate fill-in-the-blank words exists and has the same pointing time, priority is set for extracting the words which satisfy the limited number. For example, the priority is set as follows:

(1) Giving priority to a noun; and (2) Giving priority to a predefined character type among character types such as English, katakana, kanji, hiragana and the like. For example, a word in katakana is prioritized over words in kanji and hiragana.

Such constraint conditions and priority conditions in the constraint condition file 71 can be reflected to the test question generation processing by setting suitable constraint conditions and priority conditions as desired, based on the lecture contents for which questions are generated, a level of students and the intention of the lecturer.

Figure 4:
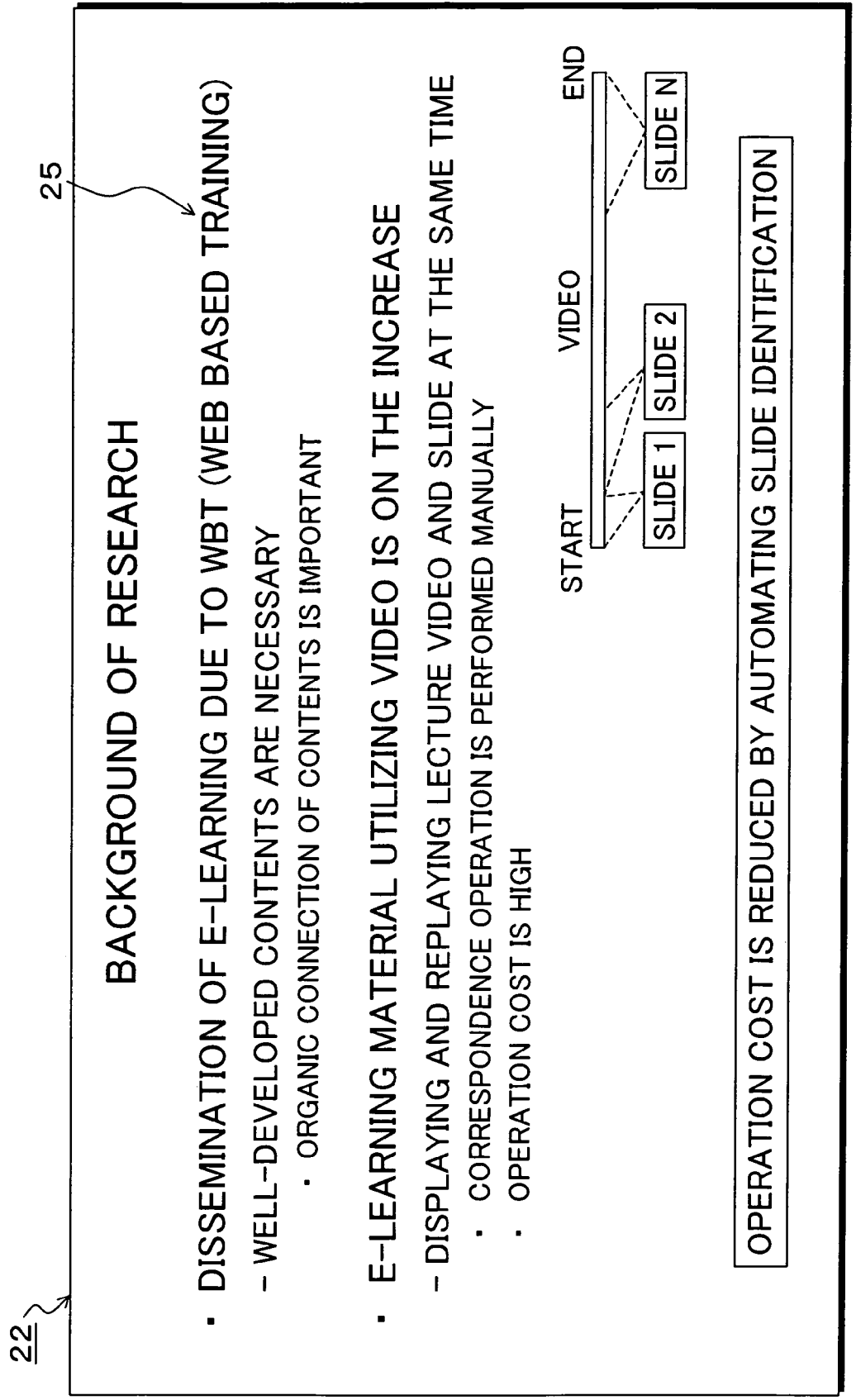
FIG. 4 is an explanatory view of a slide file used in the present invention.

FIG. 4 is an explanatory view of a slide file used in the lecture, which is the target of the processing of the present invention. In FIG. 4, a slide file 22 is, for example, a PowerPoint® file and text sentences 25 are displayed on the slide.

Figure 5:
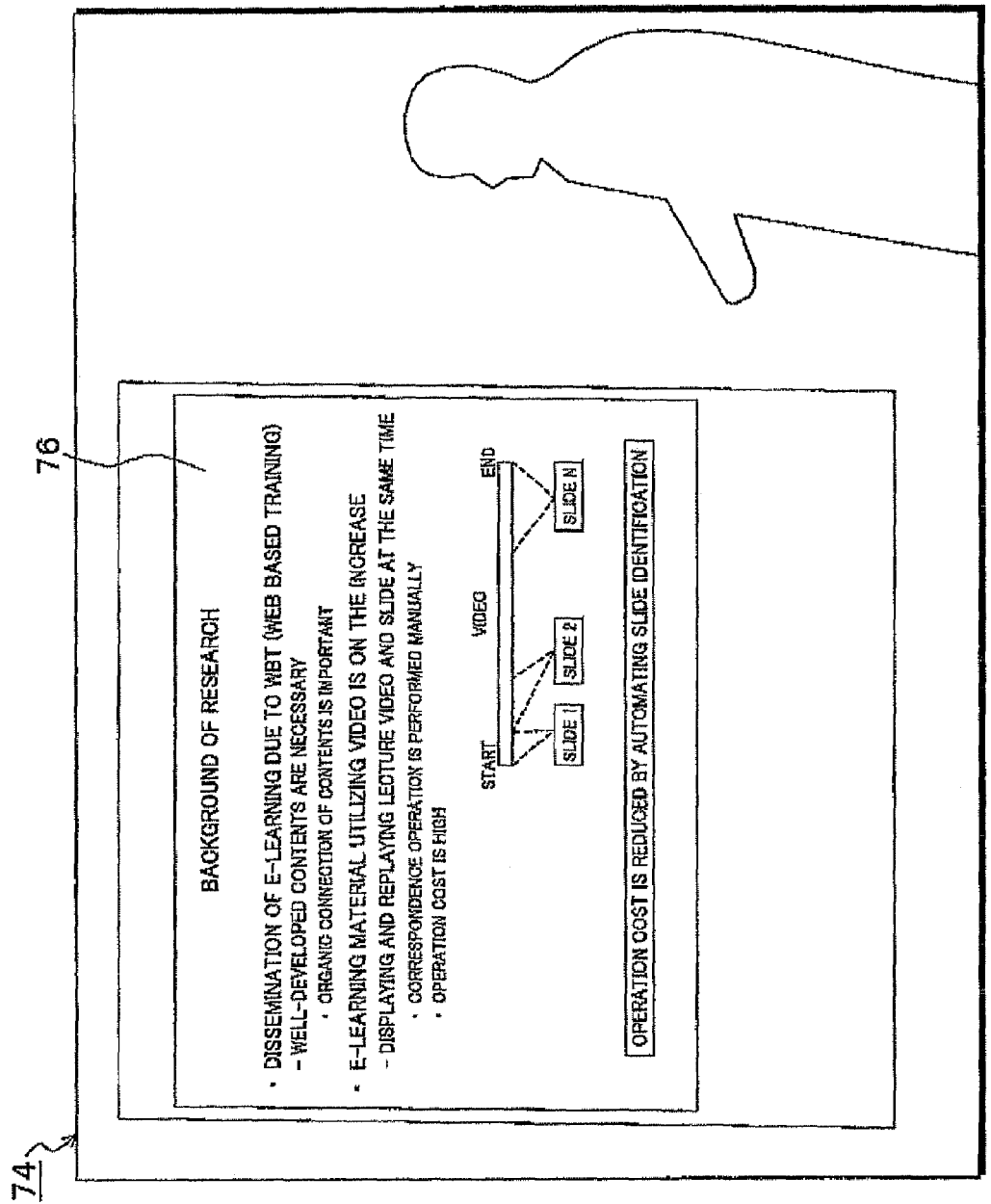
FIG. 5 is an explanatory view of a lecture video used in the present invention.

FIG. 5 is a video image of the lecture using the slide file 22 of FIG. 4. In FIG. 5, a video image 74 is one (1) scene of the lecture of the lecturer 16 using the slide 14 shot by the video camera 12 as shown in FIG. 1, and a slide image 76 is projected in the video image 74. When the slide file 22 of FIG. 4 and the video image 74 of FIG. 5 are input to the fill-in-the-blank test question generation apparatus 10 of FIGS. 3A and 3B to generate the fill-in-the-blank test question by extracting the important portion described for a longer time by the lecturer based on positions pointed with the laser spot of the laser pointer, a slide image 76 is clipped out from the video image 74 of FIG. 5 by image processing; after processing is performed for synchronizing the slide file 22 of FIG. 4 and the slide image 76 as image information, the pointing information is generated from the slide image 76; the word information is also generated from the slide file 22 of FIG. 4; the word pointing information is extracted by coupling both pieces of the information; and the test question is generated by extracting a word with the longer pointing time as the fill-in-the-blank word.

FIGS. 6A and 6B and FIG. 7 are explanatory views showing a procedure of the fill-in-the-blank test question generation processing of the present invention in accordance with the functions of the application execution environment 52 provided in the fill-in-the-blank test question generation apparatus 10 of FIGS. 3A and 3B. In FIGS. 6A and 6B, first, processing is performed by the word information generation unit 60 of FIGS. 3A and 3B. The word information generation unit 60 reads, for example, three (3) target slide files 22-1 to 22-3, extracts text information from each of the slide files 22-1 to 22-3 and executes text information extraction processing 80 for generating text information files 82-1 to 82-3. For each of the text information files 82-1 to 82-3, morpheme analysis processing 84 is performed using the morpheme analysis dictionary file 62 to generate word information files 64-1 to 64-3 for each slide. The word information files 64-1 to 64-3 store words obtained from the morpheme analysis of the text information extracted from each slide and the coordinate position thereof. On the other hand, the pointing information extraction unit 56 of FIGS. 3A and 3B reads the slide files 22-1 to 22-3 and video frames 78-1 to 78-3 as the video information having the content of the lecture where the slide files are used and executes correspondence processing 88 of both. The correspondence processing 88 makes correspondence of (identifies) the video frame 78-1 to 78-3 showing each of the slide files 22-1 to 22-3. The correspondence processing 88 generates a correspondence information file 90 identifying the correspondence relationship between the video frames and slides. Subsequently, for the correspondence information file 90, display time detection processing 92 is performed for each slide to generate a slide display time file 94. The detection of the slide display time detects the total time of all the frame times of the video frames belonging to each slide for the correspondence information file 90. Further, the pointing information extraction unit 56 executes pointing information detection processing 95 of FIGS. 6A and 6B to generate a pointing information file 58-1 to 58-3 for each slide. For example, taking the slide file 22-1 as an example, the pointing information detection processing 95 extracts pointing coordinates and a clock time thereof of the spot of the laser pointer in each of the video frame 78-1 to 78-n corresponding to the slide file 22-1 and converts the pointing coordinates on the video frame into the coordinates on the slide. As a result of the processing, the coordinates (slide coordinates) are output as the pointing information for each slide.

Figure 8:
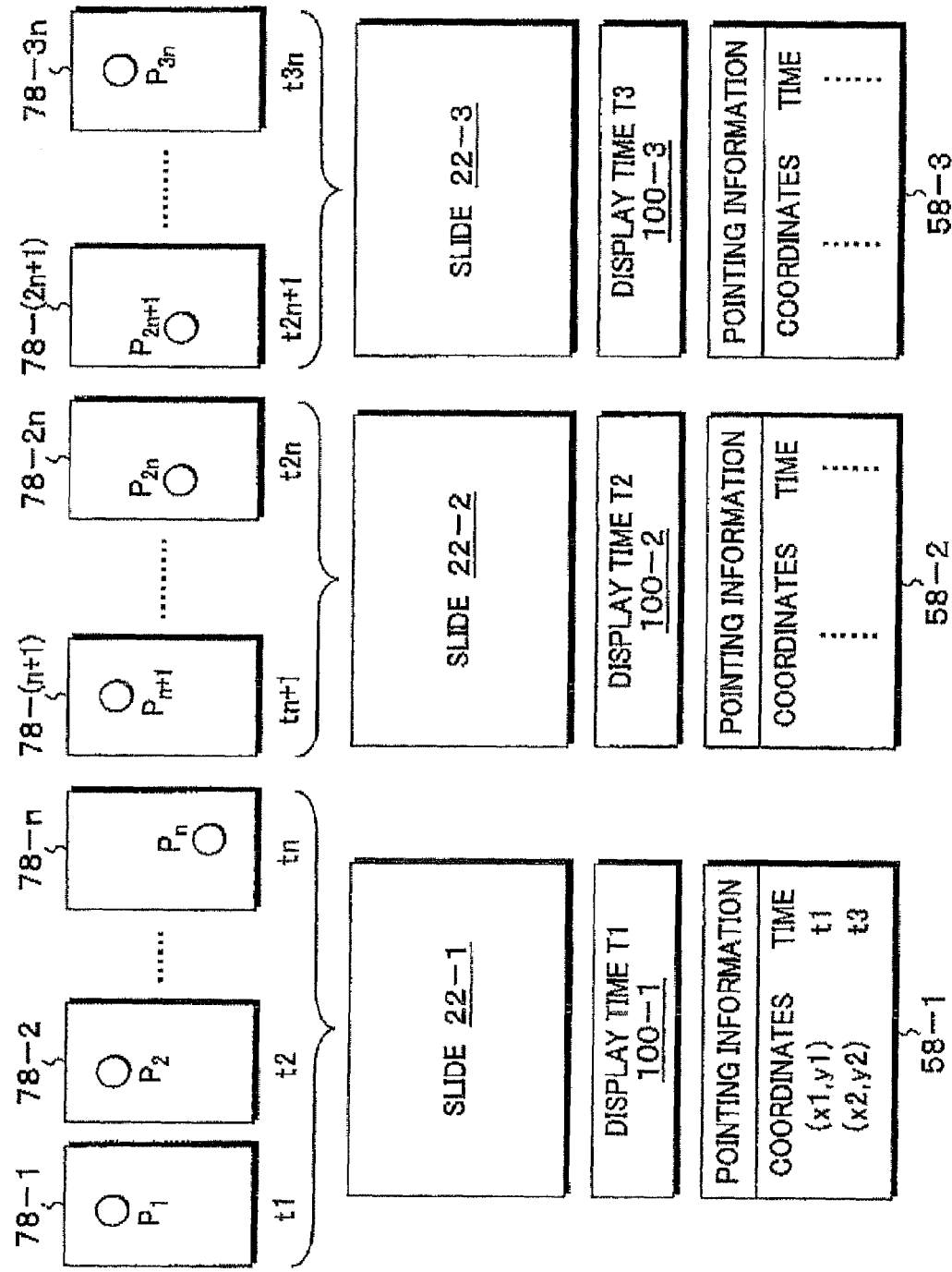
FIG. 8 is an explanatory view of processing for generating pointing information from video frames for each slide.

FIG. 8 shows details of the pointing information detection processing 95 of FIGS. 6A and 6B. In FIG. 8, for video frames 78-1 to 78-3n, by the correspondence processing, the slide 22-1 is made correspond to the video frame 78-1 to 78-n; the slide 22-2 is made correspond to the video frame 78-(n+1) to 78-2n; and the slide 22-3 is made correspond to the video frame 78-(2n-1) to 78-3n. After the identification making the correspondence between the video frames 78-1 to 78-3n and the slides 22-1 to 22-3, for the slides 22-1 to 22-3, display times 100-1 to 100-3 of the slides 22-1 to 22-3 are detected from frame clock times t1 to t3n of the corresponding video frames 78-1 to 78-3n. The display time T1 of the slide 22-1 is the time from the start clock time t1 to the end clock time tn of the corresponding frames. The display time T2 of the slide 22-2 is the time from the corresponding frame clock time tn+1 to the end clock time t2n. The display time T3 of the slide 22-3 is the time from the corresponding frame clock time t2n+1 to the flame clock time t3n. Further, for each slide 22-1 to 22-3, the pointing information file 58-1 to 58-3 is generated for each of pointers P1 to P3n of the laser pointer taken as images in the corresponding video frames 78-1 to 78-3n. For example, taking the video frames 78-1 and 78-2 made correspond to the slide 22-1 as an example, the coordinates of the pointer P1 of the laser pointer is (x1, y1) and a clock time t1 is stored. For the next video frame 78-2, the coordinates of the point P2 (x2, y2) and a clock time t2 of the coordinates are stored. Although the video frames 78-1 to 78-3n of FIG. 8 are an example in the case that all the frames shows the pointer of the laser pointer, this is for the purpose of facilitating the description, and in the actual video images, the pointer may be shown or not shown depending on the situation of the lecture, of course.

Referring again to FIGS. 6A and 6B, once the word information files 64-1 to 64-3 and the pointing information files 58-1 to 58-3 are generated for each slide by the processing of the word information generation unit 60 and the pointing information extraction unit 56 of FIGS. 3A and 3B, the procedure moves to processing of FIG. 7. FIG. 7 shows a-processing procedure of the word pointing information generation unit 65 and the fill-in-the-blank question word extraction unit 68 of FIGS. 3A and 3B. First, the word pointing information generation unit 65 reads the word information files 64-1 to 64-3 and the pointing information files 58-1 to 58-3 generated for each slide, executes word pointing information generation processing 96 and generates word pointing information files 66-1, 66-1 and 66-3.

Figure 9A:
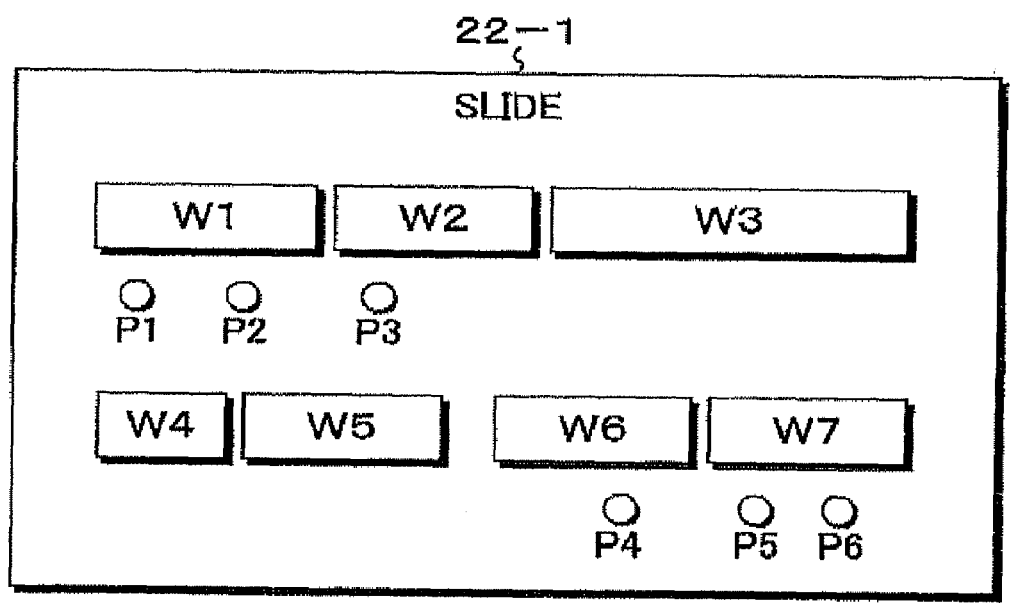
FIG. 9 is an explanatory view of processing for generating word pointing information from word information and pointing information.

FIGS. 9A and 9B show details of the word pointing information generation processing 96. FIG. 9A shows the pointing information file 58-1 and the word information file 64-1 on the slide 22-1 for the purpose of facilitating the description, and the slide 22-1 shows words W1 to W7, which are the content of the word information file 64-1, and the pointers P1 to P6 of the pointing information file 58-1. FIG. 9B is a procedure of generation processing for the word pointing information based on the slide 22-1. In FIG. 9B, the pointing information 58-1 stores coordinates PP1 to PP6 on the slide 22-1 and pointing times t1 to t6 for the pointers P1 to P6. On the other hand, the words W1 to W7 and the coordinates WP1 to WP7 of the words are registered into the word information file 64-1. Therefore, based on the pointing information file 58-1 and the word information file 68-1, the arrangement of the words W1 to W7 and the arrangement of the pointers P1 to P6 can be obtained as shown on the slide 22-1 of FIG. 9A. Then, in the order of the pointer P1 to P6, a word closest to each pointer is determined. In this example, the pointers P1 and P2 are closest to the word W1; the pointer P3 is closest to the word W2; the pointer P4 is closest to the word W6; and the pointers P5 and P6 are closest to the word W7. Therefore, from these relationships, pointer/word correspondence information 102 of FIG. 9B is generated as intermediate working information. For the pointer/word correspondence information 102, by grouping the times of the same word together and by combining the coordinates of the word with this, word pointing information 68-1 is generated. The word pointing information file 66-1 is constituted by words, coordinates and times and groups the clock times when pointed by the laser pointer, which specifically are the frame clock times, for each word. Since the frame clock time has a certain time interval, each clock time t1 to t6 can be handled as a frame unit time. Assuming that the frame unit time is T, conversion to time can be achieved as (t1, t2)=2T; t3=T; t4=T; and (t5, t6)=2T. When generating the word pointing information file 66-1, the distance between the pointer and the word is detected as shown in FIG. 10, for example.

Figure 10:
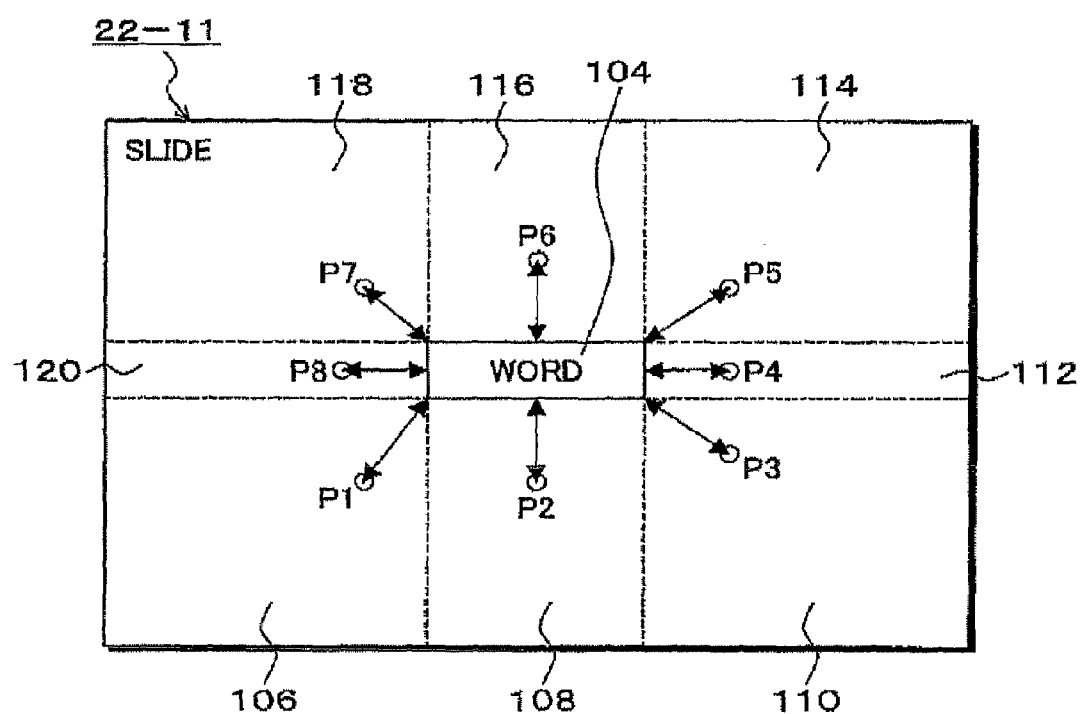
FIG. 10 is an explanatory view of detection processing for distance between a word and a pointer of FIG. 9.

FIG. 10 shows the case of disposing a word 104 on a slide 22-11, the word 104 has coordinates with two (2) coordinate points on the upper left corner and the lower right corner as coordinates of a word region. By having the coordinates with two (2) points on the upper left corner and the lower right corner, a rectangular region of the word 104 can be identified. Around the word 104, eight (8) regions 106 to 120 are formed which are divided vertically and horizontally by dashed lines. For the regions 108, 112, 116 and 120 outside of each side of the rectangular region of the word 104, the distances are detected for perpendicular lines extended to the sides from the pointers P2, P4, P6 and P8 existing in those regions. On the other hand, for the regions 106, 110, 114 and 118 corresponding to the corners of the word 104, the distances are detected for a line which connects each corner with the pointers P1, P3, P5 and P7 existing in those regions.

Figure 11:
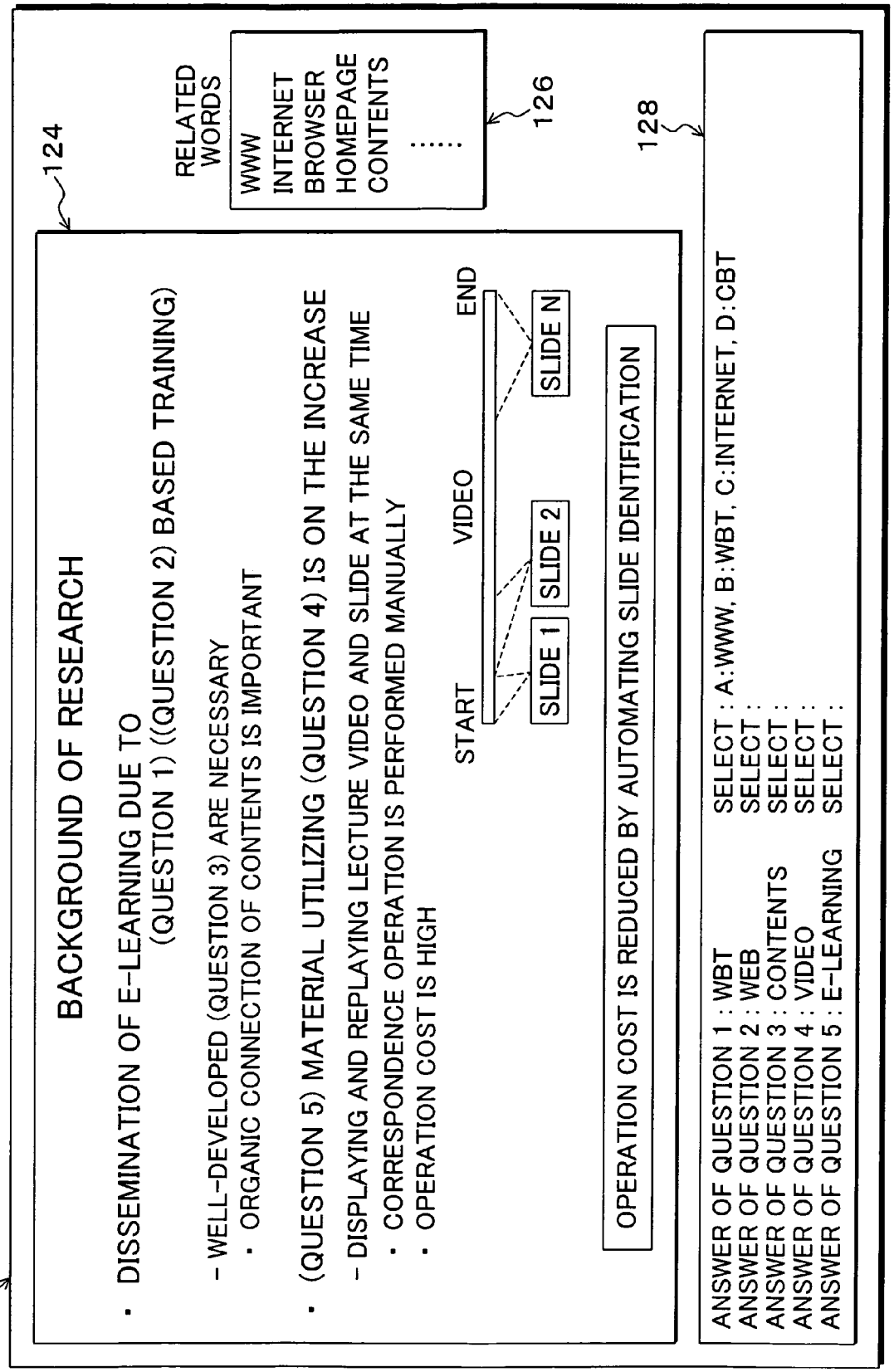
FIG. 11 is an explanatory view of a display screen of the fill-in-the-blank test questions generated according to the present invention.

FIG. 11 is an explanatory view of a display screen of the fill-in-the-blank test questions generated according to the present invention. In FIG. 11, the fill-in-the-blank test question screen 122 displays the fill-in-the-blank test questions 124 generated according to the present invention. For the fill-in-the-blank test questions 124, words, i.e., important portions, described for a longer time by the lecturer are extracted based on the laser spot of the laser pointer recorded in the video information from the slide file 22 used in the lecture shown in FIG. 4, and the extracted words are blanked and assigned with (question 1) to (question 5) in this example. To the right of the fill-in-the-blank test questions 124, a dialog of relative words 126 are displayed as clues. On the underside of the fill-in-the-blank test questions 124, an answer field is provided. In the answer field, a fill-in space of an answer is provided for each of question 1, question 2, question 3, question 4 and question 5. Also, as shown on the right of "answer of question 1", the answer field can be an answer field of a selection question, such as "A: WWW, B: WBT, C: Internet, C: CBT". In this fill-in-the-blank test questions 124, since the constraint condition is not set by the constraint condition file 71 of FIGS. 3A and 3B, the questions are consecutively assigned in one (1) line, for example, with regard to (question 1) and (question 2). Also, the fill-in-the-blank test questions 124 may not be provided with the relevant words 126 and the answer field 128 and may be in a question format such that the portions of (question 1) to (question 5) are simple blank fields such as parentheses or a box where answers can be directly written in.

FIGS. 12A and 12B are flowcharts of the fill-in-the-blank test questions generation processing according to the present invention, which is described with reference to FIGS. 3A and 3B as follows. First, in step Si, the slide file 22 is read into the word information generation unit 60 via the file input/output unit 50 and, in step S2, the text information is extracted for each slide. Then, in step S3, the morpheme analysis is performed for the text information of each slide based on the morpheme analysis dictionary file 62 and, in step S4, the word information file 64 is generated. Then, in step S5, the lecture video file is read into the pointing information extraction unit 56 from the video file 54 and, in step S6, the correspondence information of video frames and slides and the slide display time information are generated. Then, in step S7, the pointing coordinates and the pointing clock times are detected for each frame to generate the pointing information converting the pointing coordinates into the slide coordinates, which is stored into the pointing information file 58. At this point, the word information generation processing of steps S1 to S4 may be executed concurrently with the pointing information generation processing of steps S5 to S7 as parallel processing. Then, in step S8, the word pointing information is generated by the word pointing information generation unit 65 and is stored into the word pointing information file 66. Then, in step S9, the fill-in-the-blank question word extraction unit 68 extracts words equal to or greater than a threshold value from the word pointing information and, in step S10, the fill-in-the-blank question word file 70 is generated for each slide. Then, in step S11, refinement processing of the fill-in-the-blank words is performed for the fill-in-the-blank question word file 70 based on the constraint conditions in the constraint condition file 71 if desired. Then, in step S12, the test question generation unit 72 converts the positions on the slide of the fill-in-the-blank words obtained for each slide into blanks, parentheses or (question 1), (question 2) and the like to generate the fill-in-the-blank test question generations. In step S13, the fill-in-the-blank test questions are converted into, for example, the HTML format and are output to the fill-in-the-blank test question file 24.

Figure 13:
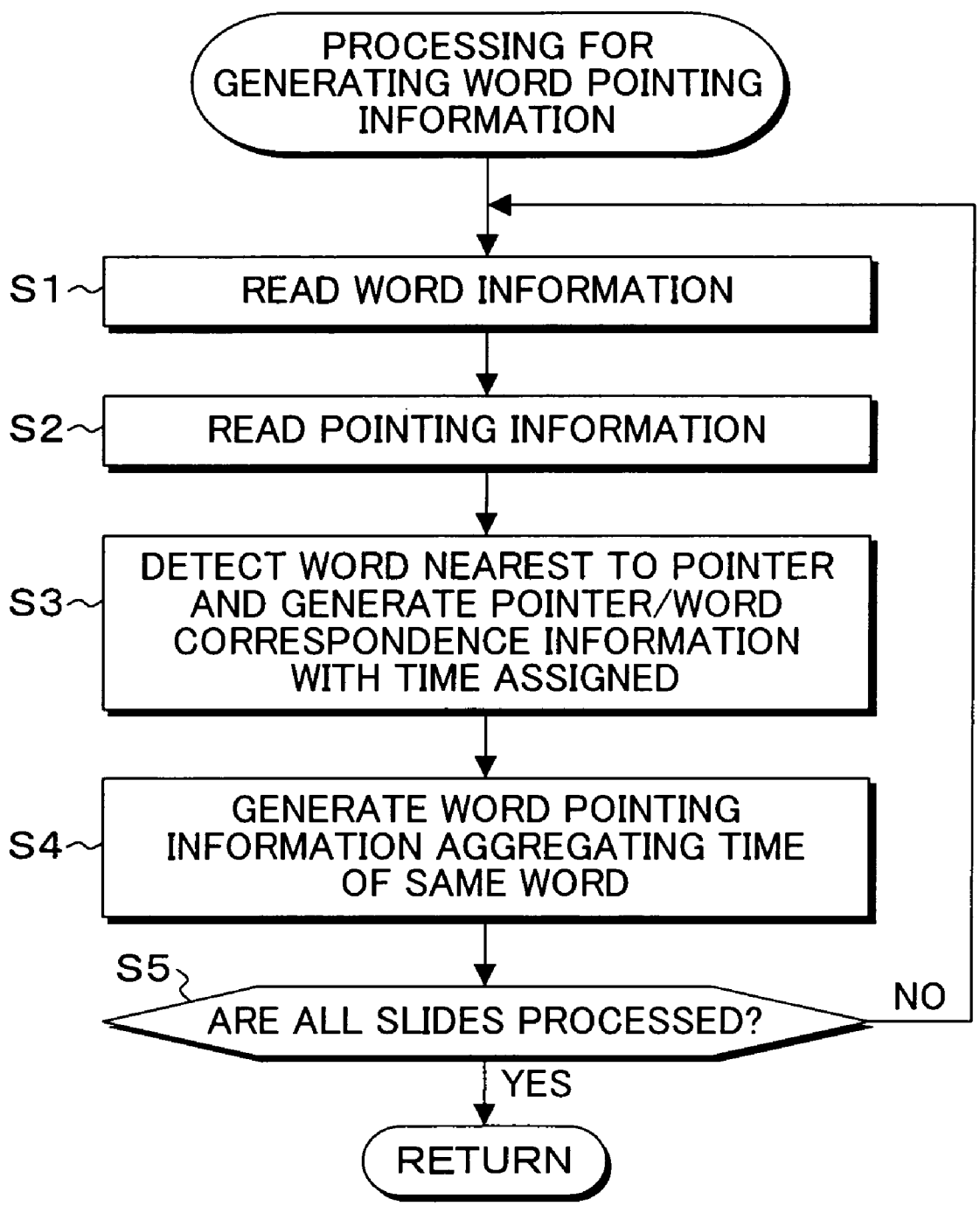
FIG. 13 is a flowchart of the word pointing information generation processing in step S8 of FIG. 12.

FIG. 13 is a flowchart showing details of the processing of the word pointing information generation unit 65 of FIGS. 3A and 3B in step S8 of FIGS. 12A and 12B. In FIG. 13, the word pointing information generation unit 65 reads the word information for each slide from the word information file 64 in step S1, reads the pointing information for each slide from the pointing information file 58 in step S2 and detects a word closest to the pointer to generate the pointer/word correspondence information which is assigned with the clock time of the word as the working information in step S3. Then, in step S4, the word pointing information is generated which aggregates clock times of the same word in the pointer/word correspondence information. Then, in step S5, it is checked whether the all the slides are processed or not, and the processing of steps S1 to S5 is repeated until all the slides are processed. Details of the word pointing information generation processing of steps S1 to S5 correspond to the processing procedure of FIG. 9.

The present invention further provides a fill-in-the-blank test question generation program executed by a computer and the program has the content in accordance with flowcharts of FIGS. 12A and 12B and FIG. 13.

The present invention further provides a computer readable recording medium storing the fill-in-the-blank test question generation program. The recording medium includes a portable recording medium such as a CD-ROM, floppy disk FD®, DVD disk, magnetic optical disk and IC card, and a storage device such as a hard disk HDD provided inside or outside of a computer system, a database keeping a program through a line, another computer system, a PC and a database thereof, or a transmission medium on a line. In the embodiment described above, although a laser pointer is taken as an example of the pointing device, in other cases, a stick used by the lecturer or a hand or fingertip of the lecturer may be extracted from the video image as a pointer and the pointing information may be extracted which indicates pointing positions and pointing clock times thereof. Also, in some cases of the lecture using the slide, a personal computer is connected with a projector, and a slide screen such as the PowerPoint® is displayed on the personal computer to display the slide with the projector in an interlocked manner. In this case, since a mouse is displayed on the slide while operating the mouse on the personal computer screen, by generating the pointing information targeting the mouse pointer, the present invention can be directly applied to the lecture video recording the screen where the slide application is operated with the mouse button. Further, although the video image is input in the embodiment described above, the pointing information may be extracted by inputting data recording the operation information of each of the slide operation and the mouse button operation on the computer. In this case, since the coordinates and clock times of the pointer are not needed to be extracted from the video frames, the processing can be simplified. Also, in the embodiment described above, the generated fill-in-the-blank test questions are converted into the HTML format to be output, the present invention is not limited to this and the questions can be converted to any formats such as a text document or a Word document to be output as long as the format can represent the test questions and can be output not only as web test questions but also as a printed paper document. The present invention encompasses appropriate modifications without impairing the object and advantages thereof and is not limited by the numeric values shown in the embodiment described above.

What is claimed is:

1. A computer readable storage medium which stores a fill-in-the-blank test question generation program operable to drive a computer to execute:

a pointing information extraction step of extracting pointing information indicating a pointing position and a pointing time on a slide from slide information used in a lecture and a video image of the lecture using a pointing device;

a word information generation step of analyzing text information extracted from the slide information to generate word information indicating a word and a position thereof;

a word pointing information generation step of estimating a word closest to the pointing position on the slide to generate word pointing information with the pointing time assigned;

a fill-in-the-blank word extraction step of extracting a word having a pointing time equal to or longer than a predetermined time from the word pointing information as a fill-in-the-blank word; and a test question generation step of setting the fill-in-the-blank word of the slide information as a blank region to generate a fill-in-the-blank test question, wherein the test question generation step extracts a fill-in-the-blank word satisfying predetermined constraint conditions from the fill-in-the-blank word information to generate a fill-in-the-blank test question, wherein the test question generation step selects fill-in-the-blank characters by setting the constraint conditions as at least one of:

being equal to or smaller than the number of fill-in-the-blank words set per line;

not being adjacent to a preceding fill-in-the-blank word; and being equal to or smaller than the number of fill-in-the-blank words set per slide page.

2. The storage medium according to claim 1, wherein the word information generation step performs a morpheme analysis of the text information to generate the word information indicating a word and a position thereof.

3. The storage medium according to claim 1, wherein the pointing information extraction step:
- identifies a correspondence relationship with the slide information for each video frame of the video information;
- detects a display time of each slide by grouping video frames for each of the slides using the identified corresponding relationship; and
- extracts pointing information indicating pointing positions and pointing clock times on the slides by extracting pointing positions and extracting pointing clock times for each of the slides, which are converted into pointing positions on the identified slides.

4. The storage medium according to claim 1, wherein the pointing information extraction step extracts a pointing position comprising a location of a bright point of a laser pointer, a mouse cursor interlocked with mouse operation on a personal computer, a tip portion of a pointing stick and a hand or fingertip of a lecturer existing in video information.

5. The storage medium according to claim 1, wherein the pointing information extraction step detects a word closest to a pointing position for each slide, assigns a pointing time and aggregates pointing clock times of the same word to generate a pointing time for each word.

6. The storage medium according to claim 1, wherein if the number of the fill-in-the-blank words is limited to a predetermined number or less by the constraint conditions, the test question generation step selects the fill-in-the-blank words equal to or smaller than the predetermined number in accordance with predetermined priority conditions.

7. The storage medium of claim 6, wherein the test question generation step selects fill-in-the-blank characters by setting the priority conditions as at least one of:
- giving priority to a noun; or
- giving priority to a predefined character type among character types such as English, katakana, kanji, hiragana and the like.

8. A fill-in-the-blank test question generation method comprising:
- a pointing information extraction step performed by a pointing information extraction unit of a computer for extracting pointing information indicating a pointing position and a pointing time on a slide from slide information used in a lecture and a video image of the lecture using a pointing device;
- a word information generation step performed by the pointing information extraction unit of the computer for analyzing text information extracted from the slide information to generate word information indicating a word and a position thereof;
- a word pointing information generation step performed by the pointing information extraction unit of the computer for estimating a word closest to the pointing position on the slide to generate word pointing information with the pointing time assigned;
- a fill-in-the-blank word extraction step performed by the pointing information extraction unit of the computer for extracting a word having a pointing time equal to or longer than a predetermined time from the word pointing information as a fill-in-the-blank word; and a test question generation step performed by the pointing information extraction unit of the computer for setting the fill-in-the-blank word of the slide information as a blank region to generate a fill-in-the-blank test question, wherein
- the test question generation step performed by the pointing information extraction unit of the computer extracts a fill-in-the-blank word satisfying predetermined constraint conditions from the fill-in-the-blank word information to generate a fill-in-the-blank test question, wherein
- the test question generation step performed by the pointing information extraction unit of the computer selects fill-in-the-blank characters by setting the constraint conditions as at least one of:
  - being equal to or smaller than the number of fill-in-the-blank words set per line;
  - not being adjacent to a preceding fill-in-the-blank word; and
  - being equal to or smaller than the number of fill-in-the-blank words set per slide page.

9. The fill-in-the-blank test question generation method of claim 8, wherein the word information generation step performed by the pointing information extraction unit of the computer performs a morpheme analysis of the text information to generate the word information indicating a word and a position thereof.

10. The fill-in-the-blank test question generation method of claim 8, wherein the pointing information extraction step performed by the pointing information extraction unit of the computer:
- identifies a correspondence relationship with the slide information for each video frame of the video information;
- detects a display time of each slide by grouping video frames for each of the slides using the identified corresponding relationship; and
- extracts pointing information indicating pointing positions and pointing clock times on the slides by extracting pointing positions and extracting pointing clock times for each of the slides, which are converted into pointing positions on the identified slides.

11. The method according to claim 8, wherein the pointing extraction step performed by the pointing extraction unit of the computer extracts a pointing position comprising a location of a bright point of a laser pointer, a mouse cursor interlocked with mouse operation on a personal computer, a tip portion of a pointing stick and a hand or fingertip of a lecturer existing in video information.

12. The method according to claim 8, wherein the pointing information extraction step performed by the pointing information extraction unit of the computer detects a word closest to a pointing position for each slide, assigns a pointing time and aggregates pointing clock times of the same word to generate a pointing time for each word.

13. The method according to claim 8, wherein if the number of the fill-in-the-blank words is limited to a predetermined number or less by the constraint conditions, the test question generation step performed by the pointing information extraction unit of the computer selects the fill-in-the-blank words equal to or smaller than the predetermined number in accordance with predetermined priority conditions.

14. The method according to claim 13, wherein the test question generation step performed by the pointing information extraction unit of the computer selects fill-in-the-blank characters by setting the priority conditions as at least one of:
- giving priority to a noun; or
- giving priority to a predefined character type among character types such as English, katakana, kanji, hiragana and the like.

15. A fill-in-the-blank test question generation apparatus comprising:

a computer executing:

a pointing information extraction unit extracting pointing information indicating a pointing position and a pointing time on a slide from slide information used in a lecture and a video image of the lecture using a pointing device;

a word information generation unit analyzing text information extracted from the slide information to generate word information indicating a word and a position thereof;

a word pointing information generation unit estimating a word closest to the pointing position on the slide to generate word pointing information with the pointing time assigned and storing the word pointing information in a storage;

a fill-in-the-blank word extraction unit reading the word pointing information from the storage, extracting a word having a pointing time equal to or longer than a predetermined time from the word pointing information as a fill-in-the-blank word and storing the extracted word into the storage; and a test question generation unit setting the fill-in-the-blank word of the slide information as a blank region to generate a fill-in-the-blank test question, wherein the test question generation unit extracts a fill-in-the-blank word satisfying predetermined constraint conditions from the fill-in-the-blank word information to generate a fill-in the-blank test question, wherein the test question generation unit selects fill-in-the-blank characters by setting the constraint conditions as at least one of:

being equal to or smaller than the number of fill-in-the blank words set per line;

not being adjacent to a preceding fill-in-the-blank word; and being equal to or smaller than the number of fill-in-the-blank words set per slide page.

16. The apparatus according to claim 15, wherein the pointing information extraction unit extracts a pointing position comprising a location of a bright point of a laser pointer, a mouse cursor interlocked with mouse operation on a personal computer, a tip portion of a pointing stick and a hand or fingertip of a lecturer existing in video information.

* * * * *

UNITED STATES PATENT AND TRADEMARK OFFICE
CERTIFICATE OF CORRECTION

| | |
|---|---|
| PATENT NO. | : 7,641,475 B2 |
| APPLICATION NO. | : 11/313962 |
| DATED | : January 5, 2010 |
| INVENTOR(S) | : Yutaka Katsuyama et al. |

It is certified that error appears in the above-identified patent and that said Letters Patent is hereby corrected as shown below:

Column 14, Line 36, after "wherein the pointing" insert --information--.

Column 14, Line 37, after "by the pointing" insert --information--.

Column 16, Lines 6-7, change "fill-in the-blank" to --fill-in-the-blank--.

Column 16, Lines 11-12, change "fill-in-the blank" to --fill-in-the-blank--.

Signed and Sealed this

Twenty-third Day of March, 2010

David J. Kappos
*Director of the United States Patent and Trademark Office*